(12) United States Patent
Hoff

(10) Patent No.: US 11,094,079 B2
(45) Date of Patent: Aug. 17, 2021

(54) DETERMINING A POSE OF AN OBJECT FROM RGB-D IMAGES

(71) Applicant: Facebook Technologies, LLC, Menlo Park, CA (US)

(72) Inventor: William Hoff, Vienna (AT)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 35 days.

(21) Appl. No.: 16/114,772

(22) Filed: Aug. 28, 2018

(65) Prior Publication Data

US 2020/0074672 A1   Mar. 5, 2020

(51) Int. Cl.
*G06T 7/73* (2017.01)
*G06T 19/00* (2011.01)

(52) U.S. Cl.
CPC .............. *G06T 7/74* (2017.01); *G06T 19/006* (2013.01); *G06T 2207/10028* (2013.01); *G06T 2207/20081* (2013.01); *G06T 2207/20084* (2013.01); *G06T 2207/30244* (2013.01)

(58) Field of Classification Search
CPC ..... G06T 19/006; G06T 1/20; G06T 2200/16; H04L 67/22; H04L 67/38; H04L 67/18; H04L 67/12; H04L 67/04; H04W 4/026; G06F 1/1694
See application file for complete search history.

(56) References Cited

U.S. PATENT DOCUMENTS

| | | | |
|---|---|---|---|
| 2005/0058337 A1* | 3/2005 | Fujimura | G06K 9/32 382/159 |
| 2017/0304732 A1* | 10/2017 | Velic | G06K 9/00201 |
| 2018/0045963 A1* | 2/2018 | Hoover | G02B 27/0172 |
| 2018/0137644 A1* | 5/2018 | Rad | G06K 9/00208 |
| 2019/0311199 A1* | 10/2019 | Mukherjee | G06K 9/00664 |

* cited by examiner

*Primary Examiner* — Jaime M Holliday

(57) ABSTRACT

A system and method for detecting a pose of an object is described. An augmented reality display device accesses first sensor data from an image sensor and a depth sensor of the augmented reality display device. The first sensor data includes a first plurality of images of an object and corresponding depth data relative to the augmented reality display device and the object. The augmented reality display device detects first features corresponding to the object by applying a convolutional neural network to the first sensor data, forms a plurality of training clusters based on the first features, and stores the plurality of training clusters in a training database.

20 Claims, 8 Drawing Sheets

DETERMINING A POSE OF AN OBJECT FROM RGB-D IMAGES

TECHNICAL FIELD

The subject matter disclosed herein generally relates to the processing of data. Specifically, the present disclosure addresses systems and methods for remote object detection and local tracking using visual odometry.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics, or GPS data. With the help of advanced AR technology (e.g., adding computer vision and object recognition), the information about the surrounding real world of the user becomes interactive. Device-generated (e.g., artificial) information about the environment and its objects can be overlaid on the real world. However, small portable devices have limited computing resources that limit the rendering of device-generated objects.

BRIEF DESCRIPTION OF THE DRAWINGS

Some embodiments are illustrated by way of example and not limitation in the figures of the accompanying drawings.

DETAILED DESCRIPTION

Figure 1:
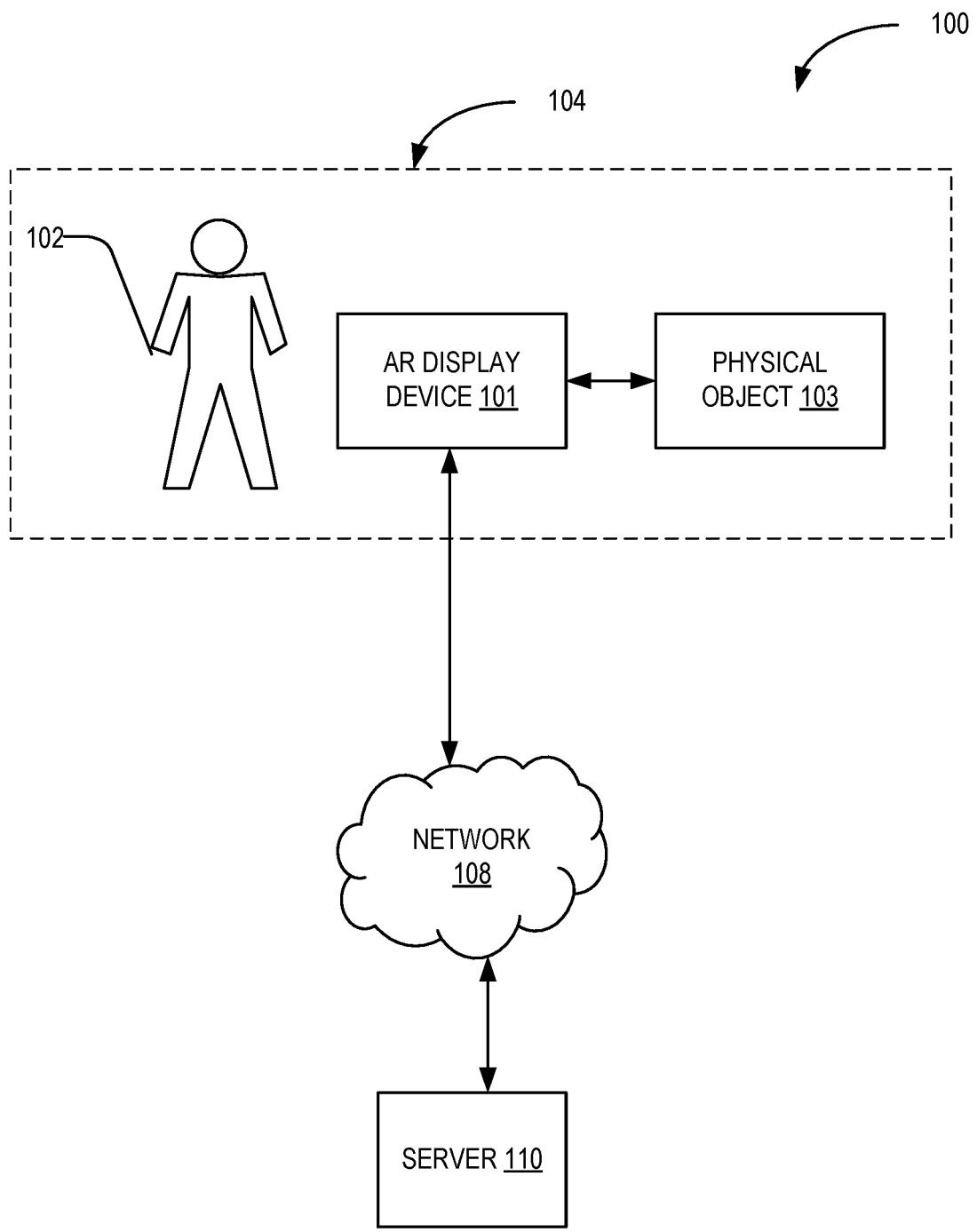
FIG. 1 is a block diagram illustrating an example of a network suitable for determining a pose of an object, according to some example embodiments.

Example methods and systems are directed to detecting a pose of an object based on images and depth data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience information, such as in the form of a three-dimensional (3D) virtual object overlaid on an image of a physical object captured by a camera of an AR display device. A rendering of the 3D virtual object may be based on a position of the AR display device relative to the physical object or relative to another frame of reference so that the virtual object appears aligned with the physical object as perceived by the user of the AR display device. For example, graphics (e.g., graphical elements containing instructions and guides) appear to be attached to a physical object of interest. In order to do this, the AR display device detects the physical object and tracks a pose of the AR display device and a pose of the object. A pose identifies a position and orientation of the object relative to a frame of reference or relative to another object. Object detection and tracking can be a very computation-intensive task, especially for wearable AR display devices with limited computational power. Performing object detection and tracking on the pose of the object can be slow, resulting in a lag time in viewing the virtual objects. The lag time further results in destroying the illusion of the virtual objects co-existing in the real world with real-world physical objects.

Some AR display devices cannot detect the object under different lighting conditions (e.g., lighting changes, partial occlusions, background changes). Furthermore, different instances of the same object type may have a slightly different appearance (for example, due to the presence of dirt, labels, placement of cables around the object).

Present state of the art often uses convolutional neural networks (CNN) for robust object pose estimation that may require large amount of training data, consisting of images of the object to be tracked under different lighting conditions. The training data (or training images) can be created using a computer-aided design (CAD) model of the object. However, a CAD model of the object may not be available. In other situations, the CAD model of the object may be inaccurate or incomplete. CAD models typically only specify shape and dimensions and not appearance (e.g., color—which is important for recognition). Even if those CAD models are available, they may not be compatible with current software operating at the AR display device and may be inaccurate.

The present disclosure addresses the problem of training an object detection system where CAD models are not available. In one example embodiment, a system and method for detecting a pose of an object is described. An augmented reality display device accesses first sensor data from an image sensor and a depth sensor of the augmented reality display device. The first sensor data includes a first plurality of images of an object and corresponding depth data relative to the augmented reality display device and the object. The augmented reality display device detects first features corresponding to the object by applying a CNN to the first sensor data, forms a plurality of training clusters based on the first features, and stores the plurality of training clusters in a training database.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR application of a device, according to some example embodiments. The network environment 100 includes an AR display device 101 and a server 110, communicatively coupled to each other via a network 108. The AR display device 101 and the server 110 may each be implemented in a computer system, in whole or in part, as described below with respect to FIG. 9.

The server 110 may be part of a network-based system. For example, the network-based system may be or include a cloud-based server system that provides additional information, such as 3D models, to the AR display device 101.

FIG. 1 illustrates a user 102 using the AR display device 101. The user 102 may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the AR display device 101 and may be a user 102 of the AR display device 101. For example, the AR display device 101 may be a computing device with a display such as a smartphone, a tablet computer, or a wearable computing device (e.g., watch or glasses). The computing device may be hand held or may be removably mounted to a head of the user 102. In one example, the display may be a screen that displays what is captured with a camera of the AR display device 101. In another example, the display of the device 101 may be transparent such as in lenses of wearable computing glasses. In other examples, the display may be a transparent display such as a windshield of a car, plane, or truck. The display may be non-transparent and wearable by the user to cover the field of vision of the user.

The user 102 may be a user of an application in the AR display device 101. The application may include an AR application configured to provide the user 102 with an experience triggered by a physical object 103, such as a two-dimensional (2D) physical object (e.g., a picture), a 3D physical object (e.g., a statue), a location (e.g., at lobby of a casino), or any references (e.g., perceived corners of walls or furniture) in the real-world physical environment. For example, the user 102 may point a camera of the AR display device 101 to capture an image of the physical object 103. The image is tracked and recognized locally in the AR display device 101 using a local context recognition dataset module of the AR application of the AR display device 101. The local context recognition dataset module may include a library of virtual objects associated with real-world physical objects or references. The AR application then generates additional information corresponding to the image (e.g., a 3D model) and presents this additional information in a display of the AR display device 101 in response to identifying the recognized image. If the captured image is not recognized locally at the AR display device 101, then the AR display device 101 downloads additional information (e.g., the 3D model) corresponding to the captured image from a database of the server 110 over the network 108.

The AR display device 101 tracks the pose (e.g., position and orientation) of the AR display device 101 relative to the pose of the physical object 103 using optical sensors (e.g., depth-enabled 3D camera, image camera), wireless sensors (Bluetooth, Wi-Fi), GPS sensor, and audio sensor to determine the location of the AR display device 101 in the physical environment 104.

The computing resources of the server 110 may be used to detect the physical object 103 based on sensor data (e.g., image and depth data) from the AR display device 101, determine a pose of the AR display device 101 and the physical object 103 based on the sensor data, generate a virtual object based on the pose of the physical object 103, and communicate the virtual object back to the AR display device 101. The object recognition, tracking, and AR rendering can be performed on either the AR display device 101, the server 110, or a combination between the AR display device 101 and the server 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 5-8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., AR display device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
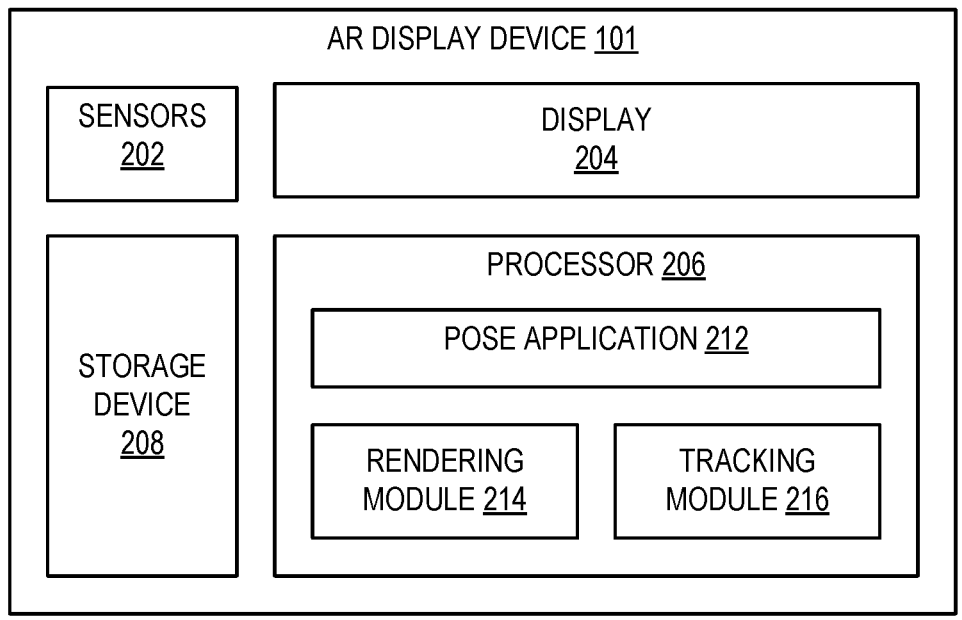
FIG. 2 is a block diagram illustrating an example embodiment of modules (e.g., components) of an augmented reality display device.

FIG. 2 is a block diagram illustrating modules (e.g., components) of the AR display device 101, according to some example embodiments. The AR display device 101 may include sensors 202, a display 204, a processor 206, and a storage device 208. For example, the AR display device 101 may be a wearable computing device, desktop computer, a vehicle computer, a tablet computer, a navigational device, a portable media device, or a smart phone of a user 102. The user 102 may be a human user (e.g., a human being), a machine user (e.g., a computer configured by a software program to interact with the AR display device 101), or any suitable combination thereof (e.g., a human assisted by a machine or a machine supervised by a human).

The sensors 202 may include, for example, a proximity or location sensor (e.g., near field communication, GPS, Bluetooth, Wifi), an optical sensor (e.g., camera such as a color camera, a thermal camera, a depth sensor and one or multiple grayscale, global shutter tracking cameras), an inertial measurement sensor (e.g., gyroscope, accelerometer), an audio sensor (e.g., a microphone), or any suitable combination thereof. For example, the sensors 202 may include a rear-facing camera and a front-facing camera in the AR display device 101. It is noted that the sensors described herein are for illustration purposes and the sensors 202 are thus not limited to the ones described.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include a pose application 212, a rendering module 214, and a tracking module 216. The pose application 212 determines a pose of an object in an image and depth data produced by sensors in the AR display device 101. The rendering module 214 renders virtual objects based on objects detected by the sensors 202. The tracking module 216 generates internal tracking data of the AR display device 101 using the sensors 202 to determine a pose of the AR display device 101 relative to a frame of reference (e.g., a room).

The pose application 212 accesses sensor data collected from, for example, a single short viewing session. The sensor data can include image data (e.g., RGB image) and corresponding depth data. For example, a user wearing the AR display device 101 examines an instance of the physical object 103 from typical viewpoints in which it would be viewed during a task. The user can place the virtual annotation (that is tagged to a static location relative to the physical object 103) at this time, or simply collect data and perform the annotation offline. An arbitrary coordinate system attached to the object can be defined at this time. For example, the arbitrary coordinate system can be determined by the location of the virtual annotations (e.g., by computing the centroid of the annotation points). In another example, the location of the arbitrary coordinate system can be determined by having the user touch or click on a point on the object. The purpose of establishing the arbitrary coordinate system on the object is so that virtual annotations and training points can be defined with respect to (or relative to) the object.

The pose application 212 uses the sensor data (also referred to as training data) to detect features in the training data using a CNN. Some features may belong to the object and some may belong to the background; the system does not know which because it does not have an a priori model of the physical object 103.

The pose application 212 can then match features from the training data with features from new images to determine a pose of the AR display device 101 and the physical object 103. Since the AR display device 101 tracks its own relative motion with respect to a world coordinate frame, there is no need to detect the object in every image. This is sufficient to determine the pose of the physical object 103 in the world. The annotations can be subsequently positioned using the AR display device 101's estimate of its pose in the world, combined with the known object-to-world pose. The pose application 212 can maintain an estimate of the object-to-world pose and update it every time the physical object 103 is detected.

Furthermore, the pose application 212 can collect additional training data to improve the performance of the system. For example, the pose application 212 discards features that have a low probability of being detected (these could belong to the background, which can change from session to session). Similarly, the pose application 212 can add features that are detected regularly, since these may belong to parts of the physical object 103 that are frequently seen. As a result, detection performance can improve with every session. The pose application 212 is described in more detail below with respect to FIG. 3.

The rendering module 214 includes a local rendering engine that generates a visualization of a 3D virtual object overlaid on (e.g., superimposed upon, or otherwise displayed in tandem with) an image of a physical object captured by a camera of the AR display device 101 in the display 204 of the AR display device 101. A visualization of the 3D virtual object may be manipulated by adjusting a position of the physical object (e.g., its physical location, orientation, or both) relative to the camera of the AR display device 101. Similarly, the visualization of the 3D virtual object may be manipulated by adjusting a position camera of the AR display device 101 relative to the physical object.

In one example embodiment, the rendering module 214 may retrieve 3D models of virtual objects associated with a real-world physical object captured using the tracking module 216. For example, the captured image may include a visual reference (also referred to as a marker) that consists of an identifiable image, symbol, letter, number, or machine-readable code. For example, the visual reference may include a bar code, a quick response (QR) code, or an image that has been previously associated with a 3D virtual object (e.g., an image that has been previously determined to correspond to the 3D virtual object).

In another example embodiment, the AR display device 101 includes a contextual local image recognition module (not shown) configured to determine whether the captured image matches an image locally stored in a local database of images and corresponding additional information (e.g., 3D model and interactive features) on the AR display device 101. In one embodiment, the contextual local image recognition module retrieves a primary content dataset from the server 110 and generates and updates a contextual content dataset based on an image captured with the AR display device 101.

The storage device 208 stores features and training data generated by the pose application 212 and sensor data generated by sensors 202. In another example embodiment, the storage device 208 may be configured to store a database of visual references (e.g., images) and corresponding experiences (e.g., 3D virtual objects, interactive features of the 3D virtual objects). For example, the visual reference may include a machine-readable code or a previously identified image (e.g., a picture of shoe). The previously identified image of the shoe may correspond to a 3D virtual model of the shoe that can be viewed from different angles by manipulating the position of the AR display device 101 relative to the picture of the shoe. Features of the 3D virtual shoe may include selectable icons on the 3D virtual model of the shoe. An icon may be selected or activated by tapping on or moving the AR display device 101.

In one example embodiment, the storage device 208 includes a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the rendering module 214 of the AR display device 101.

The contextual content dataset includes, for example, a second set of images and corresponding experiences (e.g., 3D virtual object models) retrieved from the server 110. For example, images captured with the AR display device 101 that are not recognized (e.g., by the server 110) in the primary content dataset are submitted to the server 110 for recognition. If the captured image is recognized by the server 110, a corresponding experience may be downloaded at the AR display device 101 and stored in the contextual content dataset. Thus, the contextual content dataset relies on the context in which the AR display device 101 has been used. As such, the contextual content dataset depends on objects or images scanned by the rendering module 214 of the AR display device 101.

In one example embodiment, the AR display device 101 may communicate over the network 108 with the server 110 to retrieve a portion of a database of visual references, corresponding 3D virtual objects, and corresponding interactive features of the 3D virtual objects.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
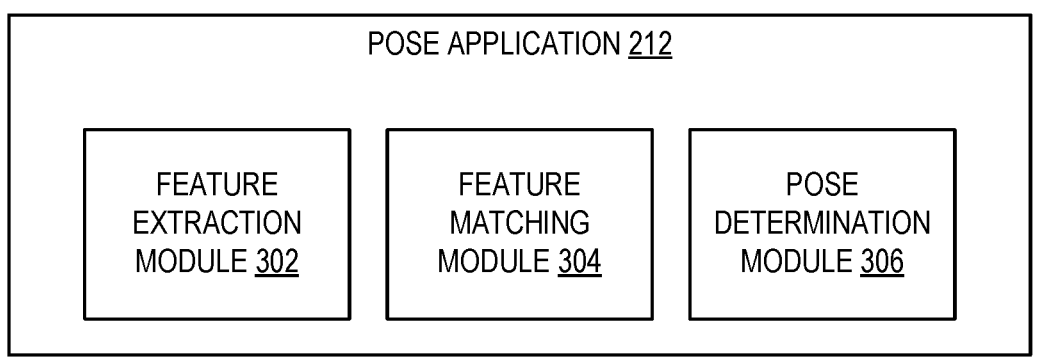
FIG. 3 is a block diagram illustrating an example embodiment of modules (e.g., components) of a pose application.

FIG. 3 is a block diagram illustrating modules (e.g., components) of the pose application 212 of FIG. 2. The pose application 212 includes a feature extraction module 302, a feature matching module 304, and a pose determination module 306. The feature extraction module 302 uses CNN to extract features from the sensor data and to generate training data based on the extracted features. In one example embodiment, the feature extraction module 302 uses a CNN. One example of CNN is called VGG-16, from the "Visual Geometry Group" at the University of Oxford. It contains 16 weight layers and has been pre-trained to detect a set of object classes in color (RGB) images. In one example, the final three fully connected layers are discarded.

The feature extraction module 302 uses feature descriptors that are computed at three different levels, or layers, of the CNN. As information is propagated through the successive layers of the CNN, features computed at deeper layers capture larger areas of the input image, although at a coarser resolution. They are also generally more descriptive, in terms of the number of dimensions. For example, in the VGG-16 CNN, at the coarsest resolution level (called "conv5"), the descriptors are 512-dimensional and are on a 30×40 grid, assuming an input image size of 480×640 pixels. At the next lower level (called "conv4"), the descriptors are 512-dimensional and are on a 60×80 grid. At the finest resolution level (called "conv3"), the descriptors are 256-dimensional and are on a 120×160 grid.

During a training session of the CNN, the feature extraction module 302 collects RGB-D images of the object, along with pose data from the AR display device 101. Next, the feature extraction module 302 processes a subset of the training images using the CNN and collects the descriptors at the three levels previously described. The feature extraction module 302 limits the number of images for processing. For example, the number of images to be processed is chosen so that the total number of descriptors is no more than 200,000. The feature extraction module 302 also collects the corresponding 3D point location for each measured descriptor, using the depth images.

Next, the feature extraction module 302 reduces the dimensionality of the descriptors by computing the principal components of each collection of descriptor vectors. In one example embodiment, the feature extraction module 302 keeps the top d principal components that account for 95% of the variance in the input data and projects the descriptor vectors onto the principal components. This reduces the number of dimensions to between 50-150 for each level.

The feature extraction module 302 then clusters the reduced dimensionality descriptors using k-means clustering. For example, the maximum number of clusters at each level is determined by the spatial resolution of the level. Each resulting cluster now contains descriptors that are very similar to each other, but may have widely different 3D locations. To achieve clusters that are also consistent in 3D location, the feature extraction module 302 can apply "mean-shift" segmentation to each cluster separately. This splits clusters into subclusters that contain points that are similar in 3D location.

The feature matching module 304 matches features from new sensor data with features from the training data. During operational usage (or "testing"), the feature matching module 304 accesses sensor data (e.g., RGB-D images) of the physical object 103, along with relative poses, from the AR display device 101. The feature matching module 304 processes each image with the CNN to extract descriptors. The descriptors are reduced in dimensionality using the same principal components found in the training session as previously described.

In one example embodiment, the feature matching module 304 processes in a coarse-to-fine manner (e.g., starting with the coarsest resolution level, then going to the next finer level, and then to the finest resolution level). The results of each level are used to guide the processing at the next finer level, thus speeding up overall processing. At each level, the feature matching module 304 matches the detected descriptors to the clusters in the training set and obtains a set of candidate correspondences. At the coarsest level, the feature matching module 304 matches all detected descriptors against all training clusters, but at finer levels, the potential matches are constrained by the results of matching at the coarser level.

The pose determination module 306 determines or identifies the pose of the physical object 103 based on the matched features. In one example embodiment, the pose determination module 306 analyzes the set of candidate correspondences to (a) find a subset that is mutually consistent, and (b) estimate the object-to-camera pose. For example, the pose determination module 306 uses the method of RANSAC (Random Sample Consensus): random subsets of three candidate correspondences are drawn, and the pose of the object is estimated from those three correspondences. The number of inliers that agree with the pose among the remaining correspondences is computed. The pose determination module 306 repeats the process for a fixed number of iterations (1000) and then returns the pose with the most inliers. If the pose determination module 306 determines that a pose is found with a sufficient number of inliers, then the pose determination module 306 proceeds to the next finer level.

Finally, if the pose determination module 306 determines that the pose was successfully found at all three levels, the virtual annotations are drawn on the image. Each image is processed independently to detect the object, with no information used from a previous image.

In another example embodiment, once the test sequence of the feature matching module 304 has been processed, the feature extraction module 302 can collect additional training data from it to improve the performance of the system. Specifically, the feature extraction module 302 can take detected features that were not matched to any training clusters and create new training clusters from them. The feature extraction module 302 can also discard training clusters that have a very low probability of matching. As a result, detection performance can improve with every session.

Figure 4:
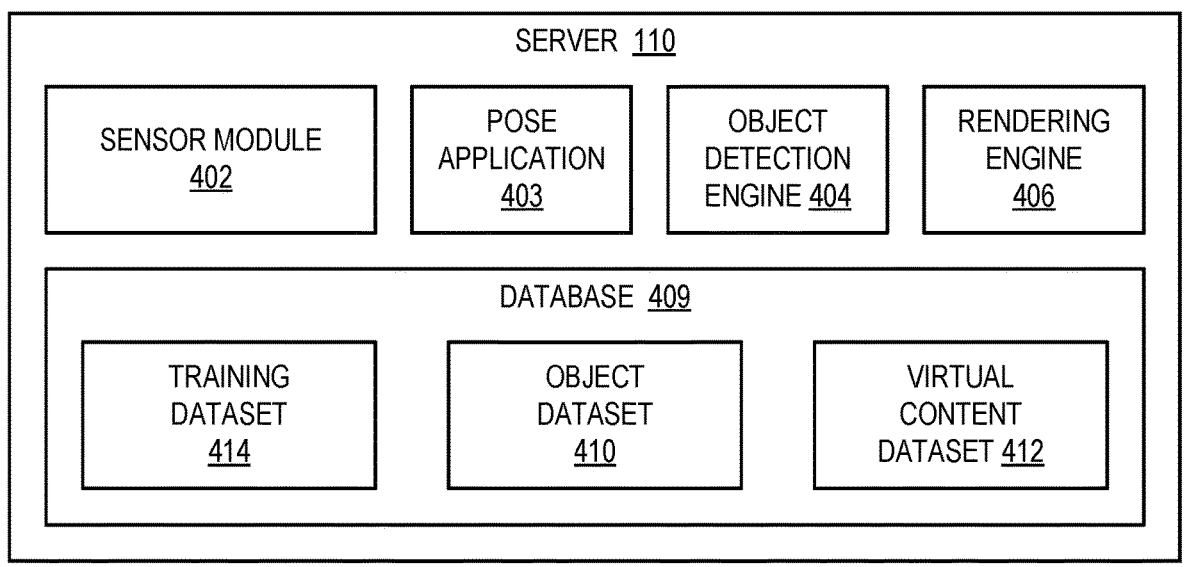
FIG. 4 is a block diagram illustrating an example embodiment of a server.

FIG. 4 is a block diagram illustrating modules (e.g., components) of the server 110. The server 110 includes a sensor module 402, a pose application 403, an object detection engine 404, a rendering engine 406, and a database 409.

The sensor module 402 interfaces and communicates with sensors 202 to obtain sensor data related to a pose (e.g., geographic location and orientation) of the AR display device 101 relative to a first frame of reference (e.g., the room or real-world coordinates) and to one or more objects (e.g., physical object 103).

The pose application 403 operates in a similar manner to pose application 212 of the AR display device 101. In one example embodiment, the pose application 403 identifies a pose of the AR display device 101 and the physical object 103 based on the sensor data from sensors 202. In another example embodiment, the pose application 403 identifies a pose of an object detected by tracking sensors (not shown) external to the AR display device 101.

The object detection engine 404 accesses the sensor data from sensor module 402 to detect and identify the physical object 103 based on the sensor data. The rendering engine generates virtual content that is displayed based on the pose of the AR display device 101 and the physical object 103.

The database 409 includes a training dataset 414, an object dataset 410, and a virtual content dataset 412. The training dataset 414 may include training data generated from the pose application 403 of the server 110, the pose application 212 of the AR display device 101, or a combination thereof. The object dataset 410 includes features of different physical objects. The virtual content dataset 412 includes virtual content associated with physical objects.

Figure 5:
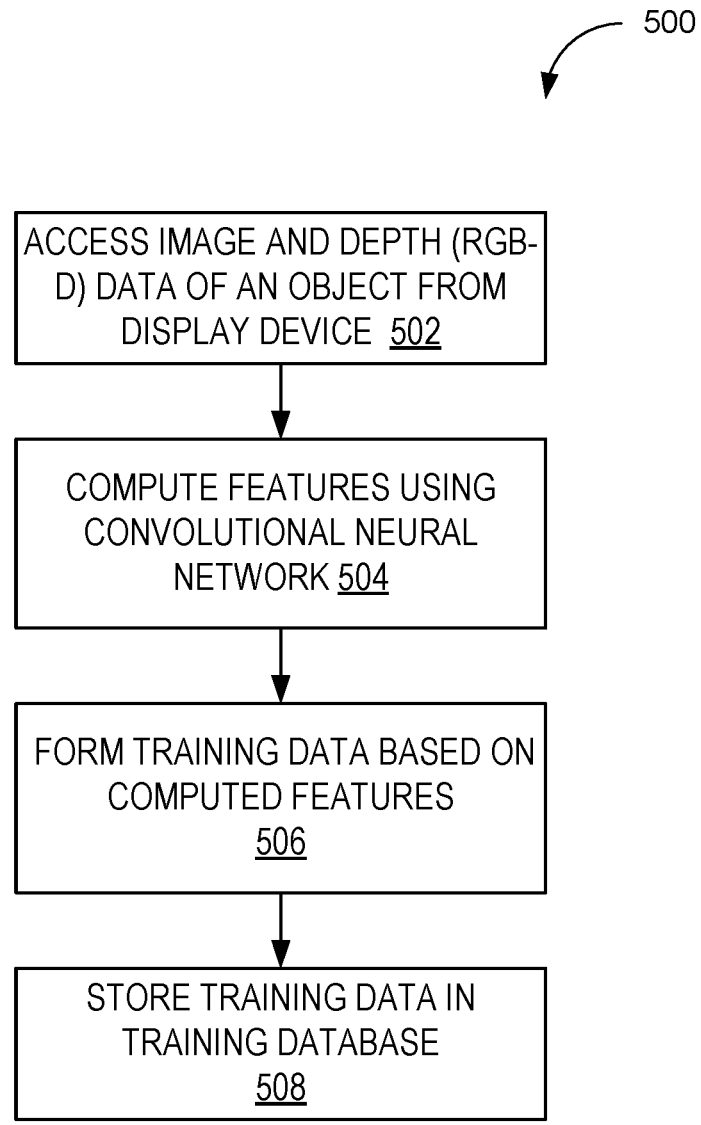
FIG. 5 is a flowchart illustrating an example operation of forming training data.

FIG. 5 is a flowchart illustrating an example operation of forming training data. Operations in the method 500 may be performed by the feature extraction module 302 of the pose application 212, using components (e.g., modules, engines) described above with respect to FIG. 3. Accordingly, the method 500 is described by way of example with reference to the feature extraction module 302. However, it shall be appreciated that at least some of the operations of the method 500 may be deployed on various other hardware configurations or be performed by similar components residing elsewhere. For example, some of the operations may be performed at the server 110.

In operation 502, the feature extraction module 302 accesses sensor data (e.g., image data and depth data) corresponding to the image of an object obtained by the AR display device 101. In operation 504, the feature extraction module 302 computes features using a CNN. In operation 506, the feature extraction module 302 forms training data based on the computed features. At operation 508, the feature extraction module 302 stores the training data in a training database in the storage device 208.

In another example embodiment, the feature extraction module 302 extracts dense features from an image using a pre-trained CNN, and the feature matching module 304 matches them to distinct 3D points on an object, using geometric constraints.

Previous methods have matched keypoints extracted from an image to a database of 3D points. Feature descriptors are extracted from the image region surrounding each keypoint. Matching is done on the basis of the similarity of the feature descriptors extracted from the image to the descriptors in the database. To verify the validity of the candidate matches, a geometric constraint is imposed (e.g., such as fitting a 6-degree of freedom pose). Keypoints are extracted at sparse locations in the image in places where the image texture is high. At these locations, the descriptors are more likely to be unique and the matching unambiguous. While these methods work very well for textured objects, they tend to fail for objects with low image texture (e.g., industrial objects such as industrial machines typically have low texture).

The feature extraction module 302 avoids the problem of needing to hand-design feature detectors and descriptors and instead learns these from images. Within a single neural network, a series of layers compute high-dimensional features at each point in the image. The upper layer of the network can be used to detect the whole object and compute its pose. This approach performs better on low texture objects. However, for the CNN to detect the whole object, many training images are required, which can be difficult to obtain.

Instead of trying to detect the complete object with the CNN, the feature extraction module 302 uses a CNN to compute high dimensional features at a dense set of points in the image. These are matched to features in a database on the basis of descriptor similarity. Coarse-to-fine processing is done to constrain possible matches. Then, conventional methods are used to verify the matches and compute the pose. The classifier for each detected point (i.e., the process by which it is matched to a specific point in the database) can be very simple; for example, the nearest (in feature space) cluster of training points and the centroid of the cluster are used as the matching point. Training is very simple because it is just a clustering of observed points, and it is also easy to incrementally modify the database with additional training examples. Therefore, the feature extraction module 302 extracts dense features from an image using a CNN and matches them to distinct 3D points on an object, using geometric constraints.

Figure 6:
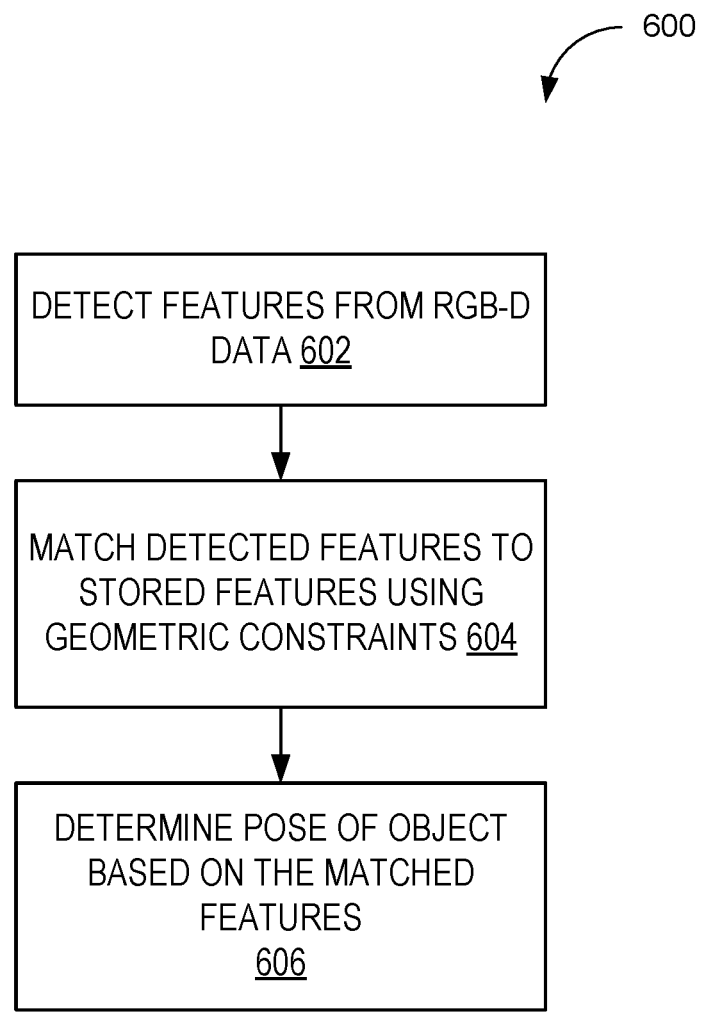
FIG. 6 is a flowchart illustrating an example operation of determining a pose of an object.

FIG. 6 is a flowchart illustrating an example operation of determining a pose of an object. Operations in the method 600 may be performed by the feature extraction module 302, the feature matching module 304, and the pose determination module 306 of the pose application 212, using components (e.g., modules, engines) described above with respect to FIG. 3. Accordingly, the method 600 is described by way of example with reference to the feature extraction module 302, the feature matching module 304, and the pose determination module 306. However, it shall be appreciated that at least some of the operations of the method 600 may be deployed on various other hardware configurations or be performed by similar components residing elsewhere. For example, some of the operations may be performed at the server 110.

In operation 602, the feature extraction module 302 detects features from new sensor data (e.g., RGB-D data) from the AR display device 101. In operation 604, the feature matching module 304 matches the detected features to stored features in the training data using geometric constraints. At operation 606, the pose determination module 306 determines the pose of the object based on the matched features.

Figure 7:
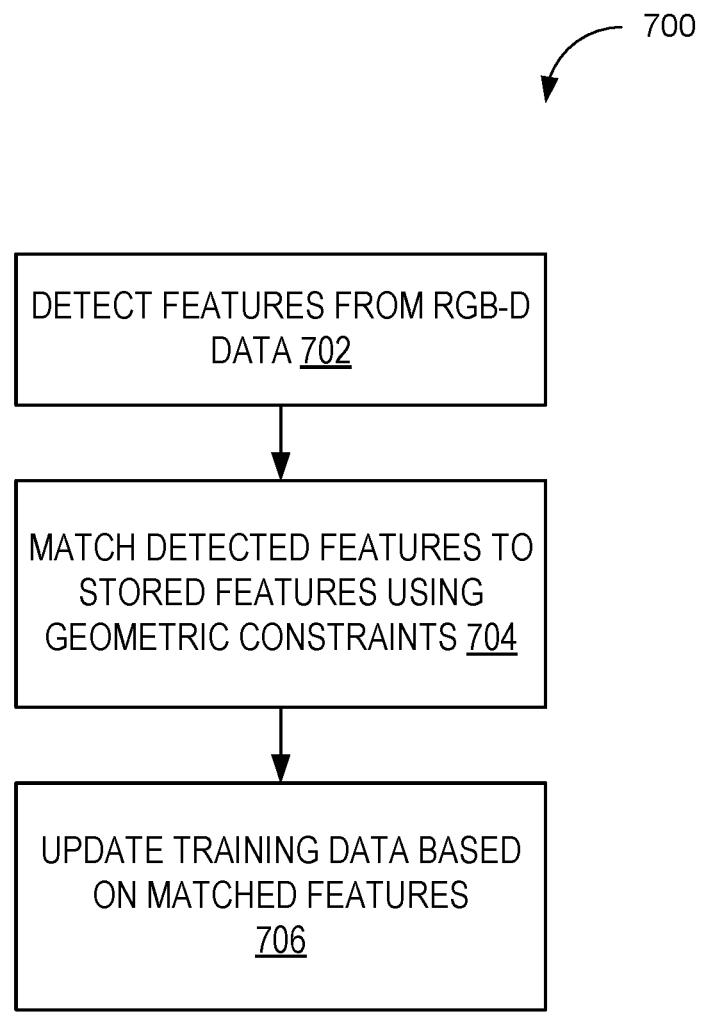
FIG. 7 is a flowchart illustrating an example operation of updating training data.

FIG. 7 is a flowchart illustrating an example operation of updating training data. Operations in the method 700 may be performed by the feature extraction module 302, using components (e.g., modules, engines) described above with respect to FIG. 3. Accordingly, the method 700 is described by way of example with reference to the feature extraction module 302. However, it shall be appreciated that at least some of the operations of the method 700 may be deployed on various other hardware configurations or be performed by similar components residing elsewhere. For example, some of the operations may be performed at the server 110.

In operation 702, the feature extraction module 302 detects features from new sensor data (e.g., RGB-D). The feature matching module 304 matches the detected features to stored features in the training data using geometric constraints at operation 704. At operation 706, the feature extraction module 302 updates the training data based on the matched features.

Figure 8:
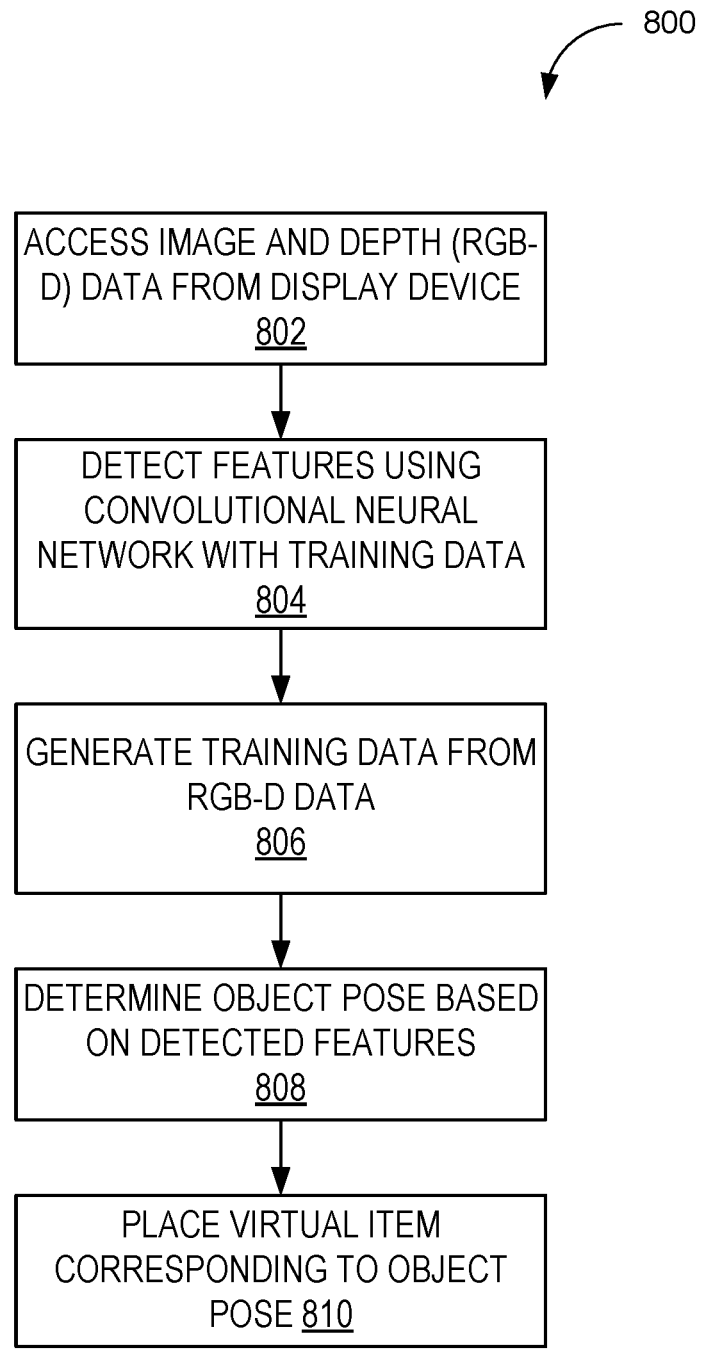
FIG. 8 is a flowchart illustrating an example operation of placing virtual item corresponding to a pose of an object.

FIG. 8 is a flowchart illustrating an example operation of placing a virtual item corresponding to a pose of an object. Operations in the method 800 may be performed by the feature extraction module 302, the feature matching module 304, and the pose determination module 306 of the pose application 212, using components (e.g., modules, engines) described above with respect to FIG. 3. Accordingly, the method 800 is described by way of example with reference to feature extraction module 302, the feature matching module 304, and the pose determination module 306. However, it shall be appreciated that at least some of the operations of the method 800 may be deployed on various other hardware configurations or be performed by similar components residing elsewhere. For example, some of the operations may be performed at the server 110.

In operation 802, the feature extraction module 302 accesses sensor data (e.g., image data and depth data) corresponding to the image of an object obtained by the AR display device 101. In operation 804, the feature extraction module 302 detects features using a CNN. In operation 806, the feature extraction module 302 generates training data based on the computed features. At operation 808, the pose determination module 306 determines the pose of an object based on the detected features. At operation 810, the rendering module 214 or an AR application at the AR display device 101 places a virtual item corresponding to the object pose such that the virtual item appears statically "attached" to the object. In another example embodiment, the virtual item dynamically moves in relation to the object. For example, the virtual item may appear to circle or hover around the object.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
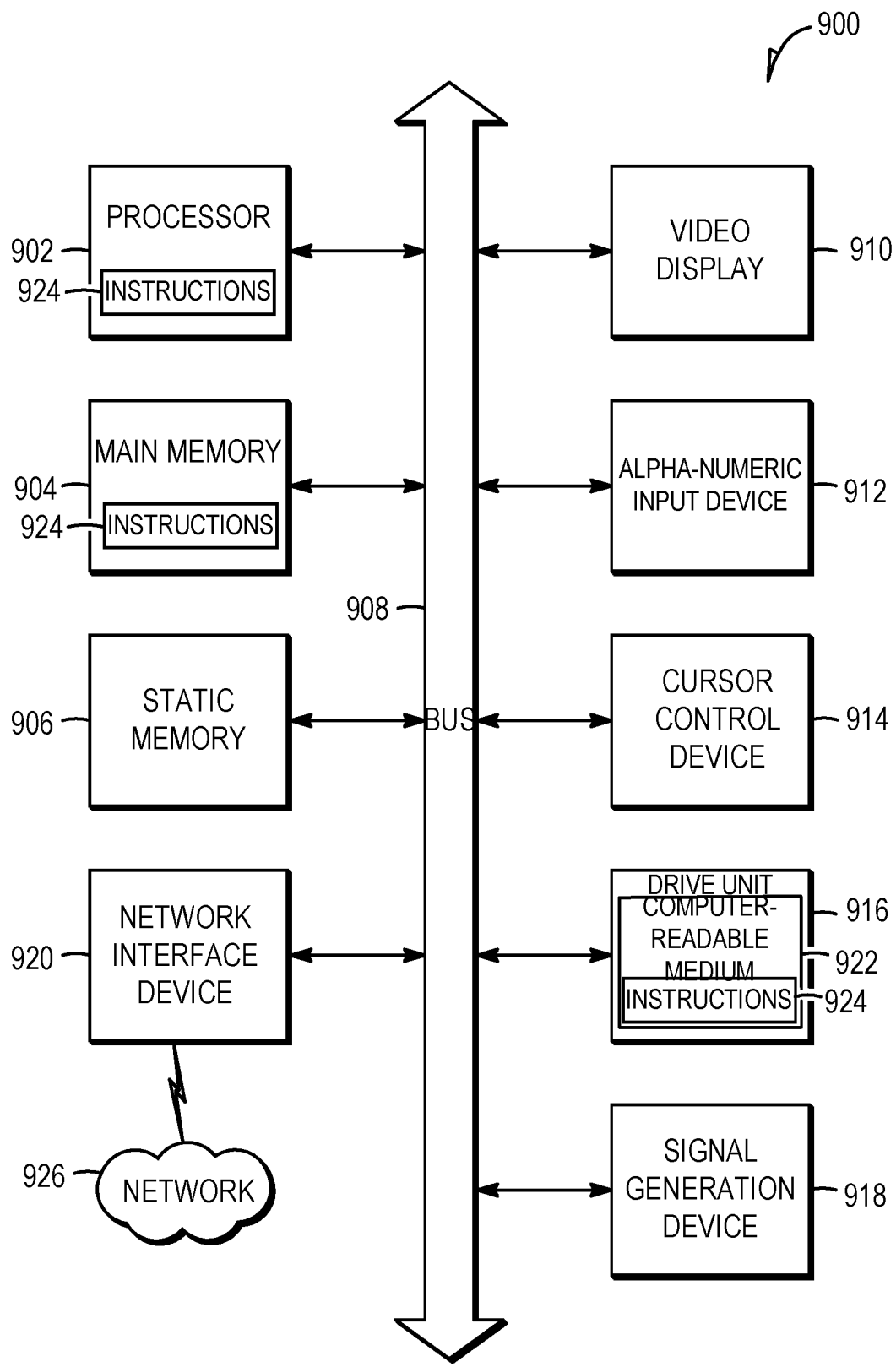
FIG. 9 is a block diagram illustrating components of a machine, according to some example embodiments, able to read instructions from a machine-readable medium and perform any one or more of the methodologies discussed herein.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions 924 for execution by the machine and that cause the machine to perform any one or more of the methodologies of the present embodiments, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    during a training phase, capturing a first set of sensor data using both an image sensor and a depth sensor of an augmented reality display device, the first set of sensor data including a first plurality of images of a physical object and corresponding depth data indicating an orientation of the augmented reality display device in relation to the physical object for each respective image;
    receiving pose data identifying a pose of the physical object depicted in each image of the physical object captured during the training phase;
    applying a convolutional neural network to the first set of sensor data, yielding a first set of features representing the physical object;
    forming a plurality of training clusters based on the first set of features generated from the first sensor data, each training cluster associated with a respective pose of the physical object;
    storing the plurality of training clusters in a training database;
    subsequently, capturing a second set of sensor data using both the image sensor and the depth sensor of the augmented reality display device, the second set of sensor data including a second set of images of the physical object and corresponding depth data indicating an orientation of the augmented reality display in relation to the physical object;
    applying the convolutional neural network to the second set of sensor data, yielding a second set of features representing the physical object;
    determining, based on the second set of features and the plurality of training clusters, that a first image from the second set of images depicts the physical object at a first respective pose associated with a first training cluster;
    determining a variance between a current orientation of the augmented reality display device and a previous orientation of the augmented reality display device when the first image was captured;
    determining a current pose of the physical object being captured by the image sensor of the augmented reality display device based on the variance and the first respective pose associated with a first training cluster;
    receiving a user-selected placement of virtual content to a static location relative to the physical object; and
    displaying the virtual content at the static location on a display of the augmented reality device, a pose of the virtual content corresponding to the current pose of the object.

2. The method of claim 1, wherein determining that the first image from the second set of images depicts the physical object at the first respective pose associated with the first training cluster comprises:
    accessing the plurality of training clusters from the training database; and
    matching the second set of features with features included in the first training cluster based on geometric constraints.

3. The method of claim 2, further comprising:
    updating the training database based on matching the second set of features with the features included in the first training cluster.

4. The method of claim 2, wherein the virtual content includes a virtual object that appears attached to the physical object on the display of the augmented reality display device.

5. The method of claim 4, wherein the virtual object is associated with the physical object.

6. The method of claim 1, wherein the plurality of training clusters are formed without accessing prior knowledge about the physically object.

7. The method of claim 1, further comprising:
    accessing a computer-aided design (CAD) model of the physical object; and
    limiting a collecting of training data based on the CAD model of the physical object wherein the plurality of training clusters are further formed based on limiting the collecting of training data.

8. The method of claim 1, further comprising:
    accessing a device pose data of the augmented reality display device based on a visual inertial system in the augmented reality display device, wherein the orientation of augmented reality display device in relation to the physical object for each respective image is further based on the device pose data.

9. The method of claim 1, further comprising:
detecting parts of the physical object and positions of components of the physical object based on the first set of features corresponding the physical object; and
identifying a state of the physical object based on the parts of the physical object and positions of components of the physical object.

10. An augmented reality display device comprising:
one or more computer processors; and
one or more computer-readable mediums storing instructions that, when executed by the one or more computer processors, cause the augmented reality display device to perform operations comprising:
during a training phase, capturing a first set of sensor data using both an image sensor and a depth sensor of the augmented reality display device, the first set of sensor data including a first plurality of images of a physical object and corresponding depth data indicating an orientation of the augmented reality display device in relation to the physical object for each respective image;
receiving pose data identifying a pose of the physical object depicted in each image of the physical object captured during the training phase;
applying a convolutional neural network to the first set of sensor data, yielding a first set of features representing the physical object;
forming a plurality of training clusters based on the first set of features generated from the first sensor data, each training cluster associated with a respective pose of the physical object;
storing the plurality of training clusters in a training database;
subsequently, capturing a second set of sensor data using both the image sensor and the depth sensor of the augmented reality display device, the second set of sensor data including a second set of images of the physical object and corresponding depth data indicating an orientation of the augmented reality display in relation to the physical object;
applying the convolutional neural network to the second set of sensor data, yielding a second set of features representing the physical object;
determining, based on the second set of features and the plurality of training clusters, that a first image from the second set of images depicts the physical object at a first respective pose associated with a first training cluster;
determining a variance between a current orientation of the augmented reality display device and a previous orientation of the augmented reality display device when the first image was captured;
determining a current pose of the physical object being captured by the image sensor of the augmented reality display device based on the variance and the first respective pose associated with a first training cluster;
receiving a user-selected placement of virtual content to a static location relative to the physical object; and
displaying the virtual content at the static location on a display of the augmented reality device, a pose of the virtual content corresponding to the current pose of the object.

11. The augmented reality display device of claim 10, wherein determining that the first image from the second set of images depicts the physical object at the first respective pose associated with the first training cluster comprises:
accessing the plurality of training clusters from the training database; and
matching the second set of features with features included in the first training cluster based on geometric constraints.

12. The augmented reality display device of claim 11, the operations further comprising:
updating the training database based on matching the second set of features with the features included in the first training cluster.

13. The augmented reality display device of claim 11, wherein the virtual content includes a virtual object that appears attached to the physical object on the display of the augmented reality display device.

14. The augmented reality display device of claim 13, wherein the virtual object is associated with the physical object.

15. The augmented reality display device of claim 10, wherein the plurality of training clusters are formed without accessing prior knowledge about the physically object.

16. The augmented reality display device of claim 10, the operations further comprising:
accessing a computer-aided design (CAD) model of the physical object; and
limiting a collecting of training data based on the CAD model of the physical object wherein the plurality of training clusters are further formed based on limiting the collecting of training data.

17. The augmented reality display device of claim 10, the operations further comprising:
accessing a device pose data of the augmented reality display device based on a visual inertial system in the augmented reality display device, wherein the orientation of augmented reality display device in relation to the physical object for each respective image is further based on the device pose data.

18. The augmented reality display device of claim 10, the operations further comprising:
detecting parts of the physical object and positions of components of the physical object based on the first set of features corresponding the physical object; and
identifying a state of the physical object based on the parts of the physical object and positions of components of the physical object.

19. A non-transitory computer-readable medium storing instructions that, when executed by one or more computer processors of an augmented reality display device, cause the augmented reality display device to perform operations comprising:
during a training phase, capturing a first set of sensor data using both an image sensor and a depth sensor of the augmented reality display device, the first set of sensor data including a first plurality of images of a physical object and corresponding depth data indicating an orientation of the augmented reality display device in relation to the physical object for each respective image;
receiving pose data identifying a pose of the physical object depicted in each image of the physical object captured during the training phase;
applying a convolutional neural network to the first set of sensor data, yielding a first set of features representing the physical object;

forming a plurality of training clusters based on the first set of features generated from the first sensor data, each training cluster associated with a respective pose of the physical object;

storing the plurality of training clusters in a training database;

subsequently, capturing a second set of sensor data using both the image sensor and the depth sensor of the augmented reality display device, the second set of sensor data including a second set of images of the physical object and corresponding depth data indicating an orientation of the augmented reality display in relation to the physical object;

applying the convolutional neural network to the second set of sensor data, yielding a second set of features representing the physical object;

determining, based on the second set of features and the plurality of training clusters, that first image from the second set of images depicts the physical object at a first respective pose associated with a first training cluster;

determining a variance between a current orientation of the augmented reality display device and a previous orientation of the augmented reality display device when the first image was captured;

determining a current pose of the physical object being captured by the image sensor of the augmented reality display device based on the variance and the first respective pose associated with a first training cluster;

receiving a user-selected placement of virtual content to a static location relative to the physical object; and displaying the virtual content at the static location on a display of the augmented reality device, a pose of the virtual content corresponding to the current pose of the object.

20. The non-transitory computer-readable medium of claim 19, wherein determining that the first image from the second set of images depicts the physical object at the first respective pose associated with the first training cluster comprises:

accessing the plurality of training clusters from the training database; and matching the second set of features with features included in the first training cluster based on geometric constraints.

* * * * *